United States Patent [19]

Sciamanna

[11] Patent Number: 5,062,955
[45] Date of Patent: Nov. 5, 1991

[54] ROTATING SLEEVE HYDROCYCLONE
[75] Inventor: Steven F. Sciamanna, Moraga, Calif.
[73] Assignee: Chevron Research and Technology Company, San Francisco, Calif.
[21] Appl. No.: 530,877
[22] Filed: May 30, 1990
[51] Int. Cl.$^5$ .............................................. B01D 45/12
[52] U.S. Cl. .................................. 210/512.1; 209/144; 209/211
[58] Field of Search ................ 210/360.1, 512.1, 512.2, 210/304; 209/144, 211; 55/400, 434

[56] References Cited

U.S. PATENT DOCUMENTS 4,936,990 6/1990 Brunsell et al. ................... 210/360.1

Primary Examiner—Frank Sever
Attorney, Agent, or Firm—V. J. Cavalieri; T. G. DeJonghe

[57] ABSTRACT

A hydrocyclone is disclosed which comprises a sleeve defining a central circularly symmetrical separation chamber. A relatively stationary fluid introduction structure is in flow communication with the separation chamber adjacent the upstream end of the sleeve. The fluid introduction structure imparts an axial component to the fluid in the direction of the downstream end of the sleeve. A more dense liquid recovery structure is present having an annular recovery entrance and having an exit for recovery of the more dense liquid. The recovery entrance is annular and radially displaced from the region of the axis of the sleeve and is in flow communication with the downstream end of the sleeve. A relatively stationary outer casing defines a central passageway about the longitudinal axis and in which the sleeve is mounted in rotatable liquid tight relation to the casing. The sleeve is rotatable in a selected rotational direction. The less dense liquid is recovered from the region of the axis.

10 Claims, 4 Drawing Sheets

ROTATING SLEEVE HYDROCYCLONE

FIELD OF THE INVENTION

The present invention relates to a hydrocyclone assembly for separating a fluid comprising immiscible less dense and more dense liquids from one another, for example, for separating oil from water.

BACKGROUND OF THE INVENTION

Rotary vortex or hydrocyclone separators have been used to separate heterogenous liquids such as water with a small oil content on offshore oil platforms. In one such apparatus, that shown in U.S. Pat. No. 4,702,837, issued Oct. 27, 1987 to Y. Lecoffre and J. Woillez, an oil/water mixture is flowed axially to the upstream end of a rotating cylindrical chamber with the rotation providing a centripetal force which causes the heavier water to concentrate away from the axis of rotation and the lighter oil to concentrate along the axis of rotation. The water/oil mixture flows downstream through the chamber with separation occurring in the manner just mentioned. The water is then removed by an annular opening and the oil is removed by an axial opening.

Other related devices are described in, for example, U.S. Pat. No. 3,862,714, issued Jan. 28, 1975 to J.D. Boadway, in German Patentschrift DD 221 093 A1 of V. Heineck and M. Markert of Apr. 17, 1975, French Patent Publication 2 588 778, J. Woillez, P. Grisard, R. Pacitti and J-C. Gay published Apr. 24, 1987, French Patent Publication 2 588,779, J. Woillez, P. Grisard, R. Pacitti and J-C. Gay published Apr. 24, 1987, and Patent Co-Operation Treaty Publication W087/06159, published Oct. 22, 1987.

The aforementioned prior art structures either do not have a rotating sleeve component to provide maximum separation or must have their stationary components very carefully aligned for optimal results. Furthermore, such structures do not handle entrained gaseous species, usually air, in an adequate manner. Still further, the structures of the prior art generally must operate at relatively high pressure differentials thereby requiring relatively heavy duty construction and resulting added costs.

The present invention is directed to overcoming one or more of the problems as set forth above.

SUMMARY OF THE INVENTION

In accordance with the present invention a hydrocyclone is set forth for separating a fluid comprising immiscible less dense and more dense liquids from one another. The hydrocyclone comprises a sleeve having upstream and downstream ends and a longitudinal axis and defining a central circularly symmetrical separation chamber. A stationary fluid introduction structure has an inlet port and an outlet port with the outlet port in flow communication with the separation chamber adjacent the upstream end of the sleeve. The fluid introduction structure at the upstream end is shaped to impart a tangential component to the fluid at the upstream end of the sleeve. A more dense-liquid recovery structure is present at the downstream end of the sleeve. It has an annular recovery entrance and an exit for recovery of the more dense liquid. The recovery entrance is annular and radially displaced from the region of the axis and is in flow communication with the downstream end of the sleeve. A stationary longitudinally extending outer casing defines a central passageway about the longitudinal axis. The sleeve is positioned in the central passageway. Mounting means are present for mounting the sleeve in sealed, rotatable, relation to the casing. Rotating means are present for rotating the sleeve in a selected rotational direction about the axis. Recovery means are present for recovering the less dense liquid from the region of the axis.

Utilizing a hydrocyclone in accordance with the present invention, alignment problems are virtually eliminated through provision of the outer casing. Also, the entire apparatus can operate at a relatively low pressure differential as the sleeve can be rotated quite rapidly within the casing thereby providing a sizeable centripetal force potential from the sleeve to the axis. In accordance with a preferred embodiment of the present invention an initial tangential component is provided by the stationary fluid introduction structure in the first rotational direction. Also in accordance with the present invention the more dense-liquid recovery structure can include means for directing the more dense fluid through a tangential exit. By these means the more dense liquid exits the recovery structure with less overall pressure drop. Another embodiment of the present invention provides a shaft which extends into the downstream portion of the chamber coaxially with the axis for carrying out the rotating of the sleeve. A lumen may be defined in the shaft which has a first opening into the downstream end portion of the chamber and which has a second opening out of which the less dense liquid exits.

In accordance with another embodiment of the present invention, the recovery means for the less dense liquid may comprise a rigid, longitudinal, tube which opens into the upstream end of the chamber. The tube is used in combination with a pedestal attached to the first or upstream end of the rotating shaft structure. The pedestal is positioned to redirect flow in the region of the axis back towards the upstream end of the chamber and into the opening in the tube. The pedestal may include a small axial hole through it which is in flow communication with a lumen defined by the shaft rotating the sleeve. Entrapped gases and a portion of the less dense fluid can then exit through the lumen. A vane structure may also be provided within the sleeve in the upstream end portion of the chamber. The vane structure is attached to the sleeve to provide a tangential acceleration to the fluid in the same direction that the sleeve is rotated by the shaft structure. The overall result is very good separation of less dense liquid from the more dense liquid with substantially no alignment problems. The apparatus operates with a lower pressure differential, from the pressure of the entrance fluid to that of the exiting more dense and less dense liquids, as compared to conventional liquid-liquid hydrocyclone separators.

DESCRIPTION OF DRAWINGS

The invention will be better understood by reference to the figures of the drawings wherein like numbers denote like parts throughout and wherein.

DETAILED DESCRIPTION OF THE INVENTION

Figure 1:
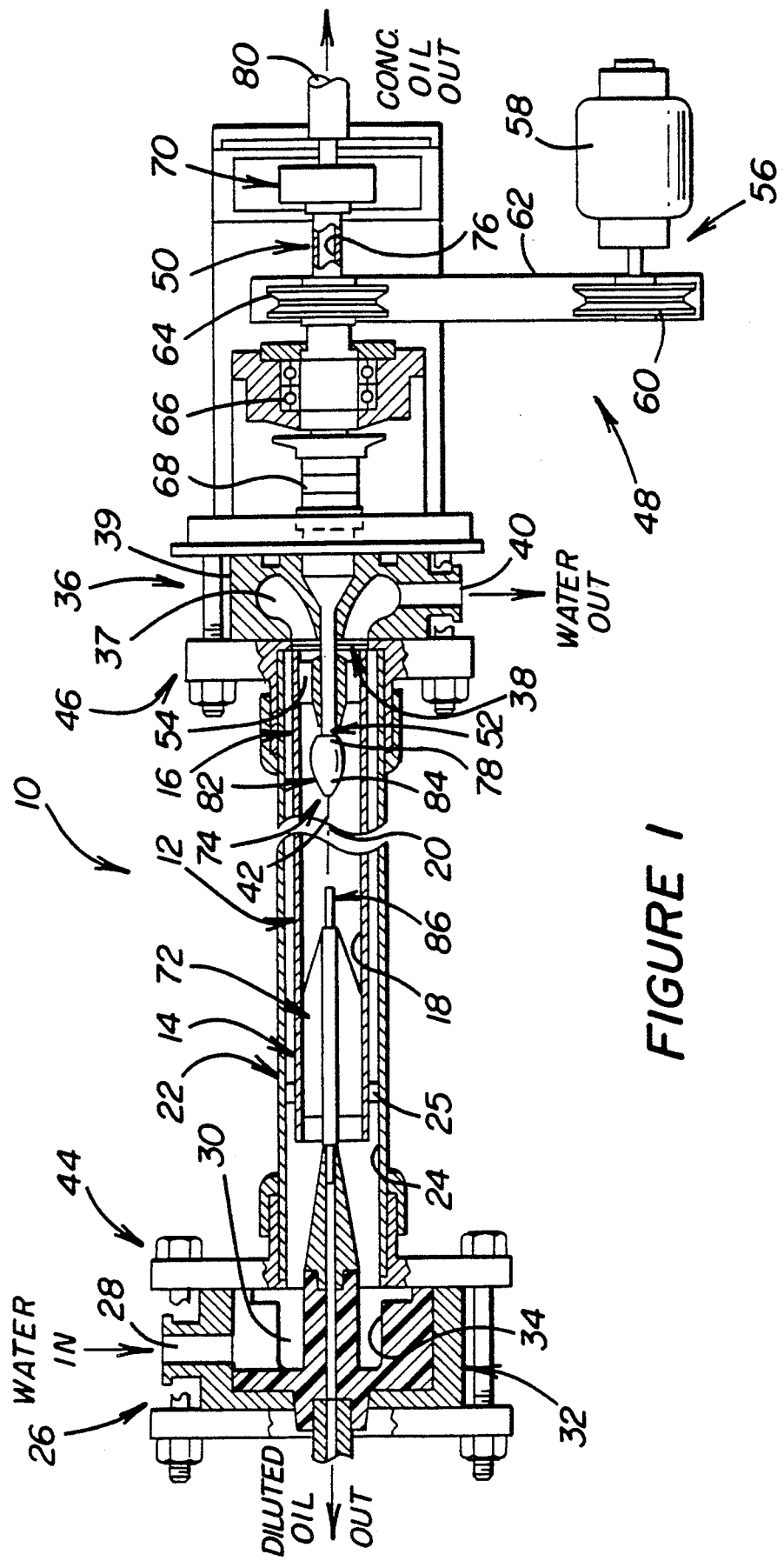
FIG. 1 illustrates, in side sectional view, one embodiment of a rotating wall of a hydrocyclone assembly in accordance with the present invention.

The invention is concerned with a novel hydrocyclone 10, one embodiment of which is shown in FIG. 1. The hydrocyclone 10 is adapted for separating a fluid comprising immiscible less dense and more dense fluids from one another. For example, oil can be separated from water. The hydrocyclone 10 is of a rotating sleeve variety and includes a rotating sleeve 12 having an upstream end portion 14 and a downstream end portion 16 with the sleeve 12 having a cylindrically, symmetrical, interior, separation chamber 18 which is symmetrical about its longitudinal axis 20.

In accordance with the invention a stationary longitudinally extending outer casing 22 defines an annular passageway 24 about the longitudinal axis 20 in surrounding relation to the sleeve 12. An appropriate bearing 25, for example a Teflon (trademark of Du Pont) bearing, aids in allowing free rotation of the sleeve 12 within the casing 22.

Figure 2:
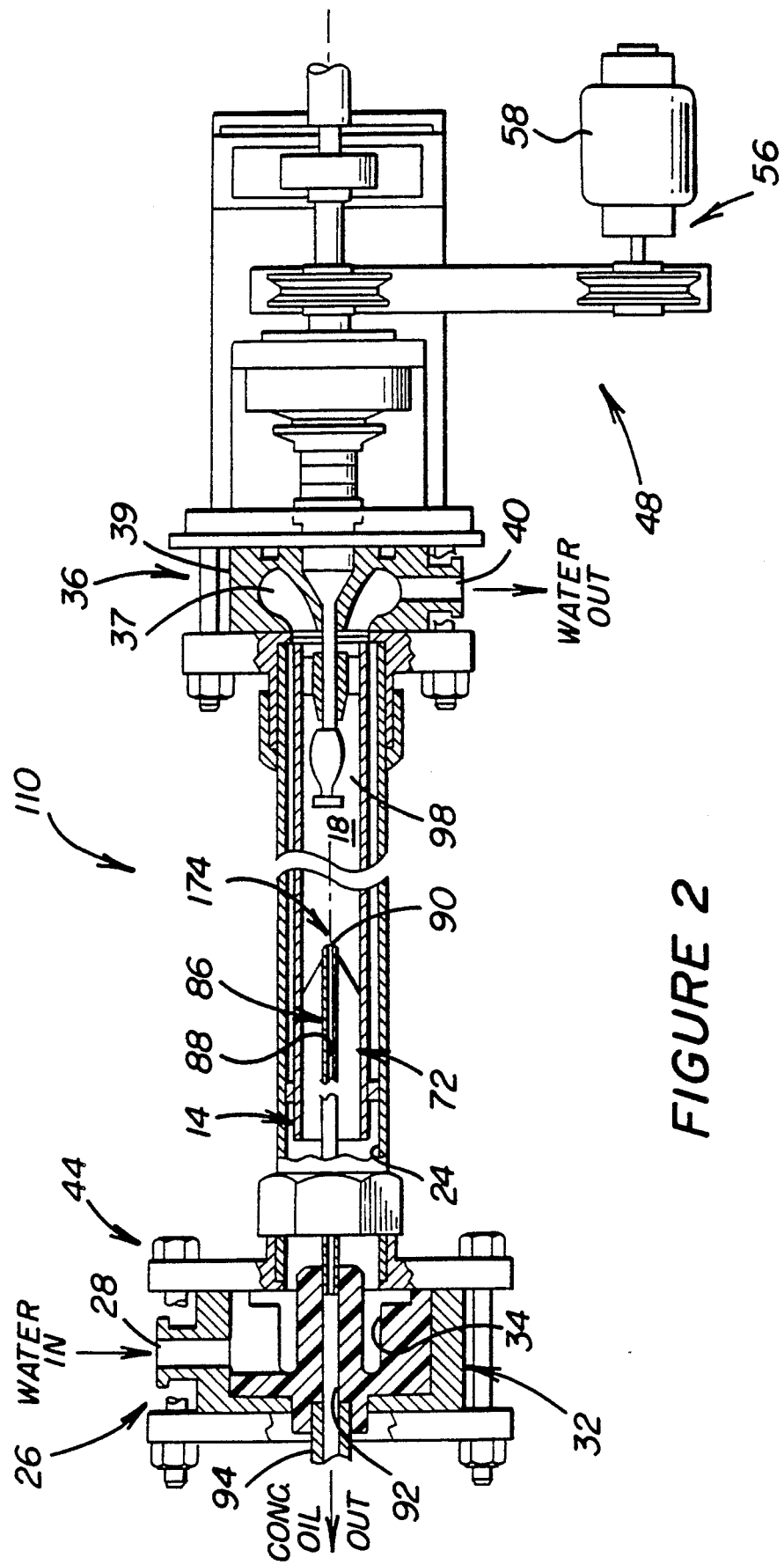
FIG. 2 illustrates, in a view similar to FIG. 1, another embodiment of a rotating wall hydrocyclone assembly in accordance with the present invention.
Figure 3:
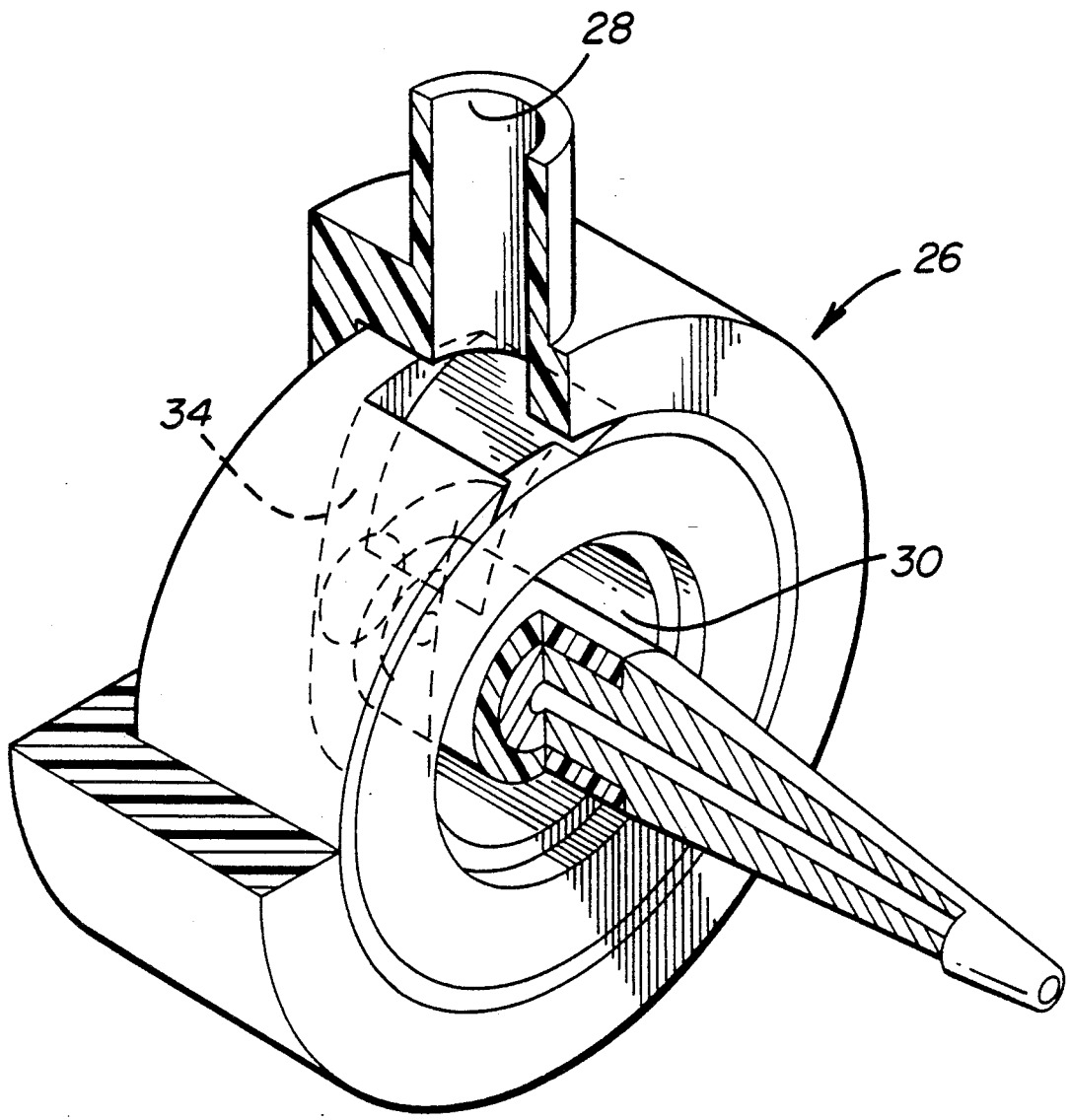
FIG. 3 illustrates an inlet involute useful in accordance with the present invention.

A stationary fluid introduction structure 26, seen best in FIG. 3, has an inlet port 28 and an outlet port 30. It is arranged with its outlet port 30 in flow communication with the chamber 18 defined by the sleeve 12 adjacent to the upstream end portion 14 of the sleeve 12. The fluid introduction structure 26 is generally adapted to impart a tangential component and an axial component to the fluid velocity in the direction of the downstream end portion 16 of the sleeve 12. The stationary fluid introduction structure 26, in the particular embodiment illustrated, comprises a block 32 (FIGS. 1 and 2) having an involute passageway 34 which empties via the outlet port 30 into the casing 22 and thence into the upstream end portion 14 of the sleeve 12.

Figure 4:
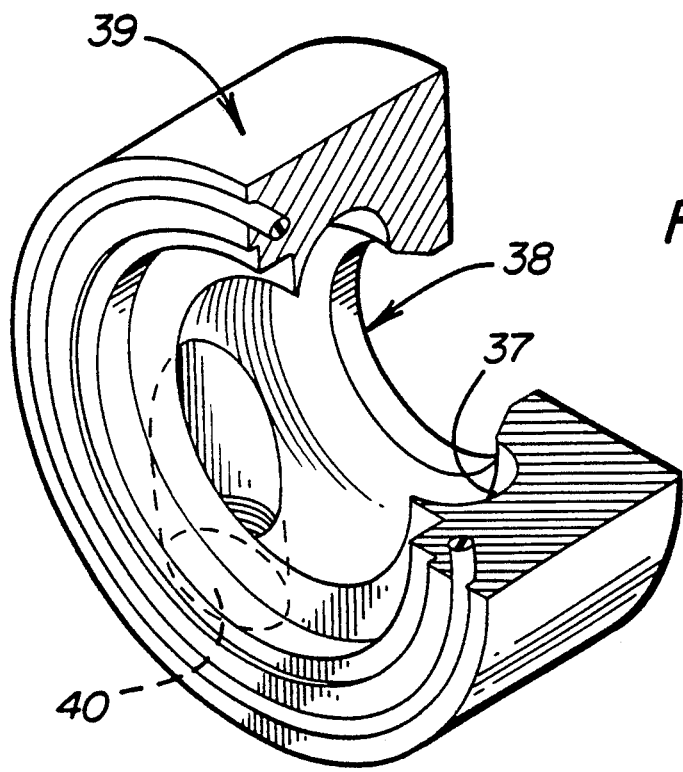
FIG. 4 illustrates, in section view, an outlet involute useful in accordance with embodiments of the present invention.

The hydrocyclone 10 also includes a more dense-liquid recovery structure 36, seen best in FIG. 4, having an annular recovery entrance 38 and an exit 40 for recovery of the more dense liquid. The recovery entrance 38 is radially displaced from the region 42 of the axis 20 and is in flow communication with the downstream end portion 16 of the sleeve 12.

In accordance with the present invention a fluid introduction structure mounting means 44 serves for mounting the casing 22 to the fluid introduction structure 26 while a more dense-liquid recovery structure mounting means 46 serves for mounting the casing 22 to the more dense-liquid recovery structure 36. This provides an overall rigid structure wherein the casing 22 unites the fluid introduction structure 26 and the liquid recovery structure 36 and holds them in proper alignment. Such alignment is advantageous in order to assure that the regions for extracting the more dense liquid and the less dense liquid are distinctly defined.

In accordance with the illustrated embodiment of the invention the more dense-liquid recovery structure 36 includes means for flowing the more dense fluid through a tangential exit in the nature of an outlet involute 37 which serves for taking spin away from the more dense liquid, the outlet involute 37 being within a block 39. This serves to reduce pressure drop across the overall structure.

Rotating means 48 are provided for rotating the sleeve 12 in a selected rotational direction about the axis 20. In the embodiment illustrated in FIGS. 1 and 2 the rotating means 48 comprises a shaft structure 50 which has a first end 52 extending into the downstream end portion 16 of the chamber 18. The first end 52 of the shaft structure 50 is connected to rotate the sleeve 12. In the particular embodiment illustrated this rotation is imparted via a plurality of vanes 54 which are affixed to the sleeve 12. The shaft structure 50 is coaxial with the axis 20 and extends through the dense-liquid recovery structure 36. Means 56 is provided for rotating the shaft structure 50 about the axis 20. In the particular embodiment illustrated, the rotating means 56 comprises an air motor 58 driving a pulley 60 which drives a belt 62 which in turn drives a pulley 64 which is attached to and rotates the shaft structure 50. Appropriate bearings 66 and pump seal packing 68 are present to prevent leakage about the shaft structure 50 and to allow the shaft structure 50 to pass rotatingly and in substantially liquid tight relation through the more dense-liquid recovery structure 36. An appropriate pillow bearing 70 can be present to provide proper alignment of the shaft structure 50.

A vane structure 72 can be provided within the sleeve 12 in the upstream end portion 14 of the chamber 18. Such a vane structure 72 is adapted to provide a tangential acceleration to the fluid in the selected rotational direction in order to increase the centripetal force which separates the less dense liquid from the more dense liquid. While the vane structure 72 is only shown in FIG. 1, such is equally useful in the embodiment of FIG. 2.

Figure 5:
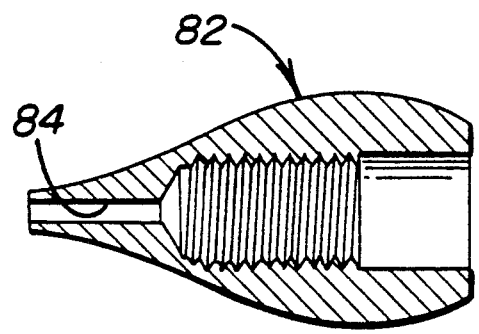
FIG. 5 illustrates a section of a vortex nozzle useful in accordance with the embodiment of FIG. 1.

In accordance with the present invention recovery means 74 are provided for recovering the less dense liquid from the region 42 of the axis 20. In the embodiment of FIG. 1 the recovery means 74 comprises a lumen 76 defined by the shaft structure 50. The lumen 76 has a first opening 78 in flow communication with the region 42 of the axis 20 in the downstream end portion 16 of the chamber 18 and further has a second opening 80 out of which the less dense liquid exits. A vortex nozzle 82, seen best in FIG. 5, having a small axial hole 84 through it which communicates with the lumen 76 can advantageously be attached to the end 52 of the shaft structure 50. The diameter of the vortex nozzle is chosen to optimize separation performance. The exterior of the nozzle 82 can be shaped to aid in flow of the more dense liquid radially outwardly about the end 52 of the shaft structure 50, as illustrated.

The operation of the embodiment of FIG. 1 proceeds as follows. Fluid comprising immiscible less dense and more dense liquids, for example water and suspended oil, is flowed into the port 28 under pressure. It then flows through the involute passageway 34 in the block 32 and exits the outlet port 30 already spinning. From the exit 30 it enters the upstream end portion 14 of the chamber 18 in the sleeve 12. The sleeve 12 is rotated by the shaft structure 52 so as to add to the tangential velocity of the fluid. Thus, as the fluid flows from the upstream end 14 to the downstream end 16 of the sleeve 12, centrifugal force leads to the more dense liquid travelling to the periphery of the sleeve 12 and the centripetal force leads to the less dense liquid gathering in the region 42 adjacent the axis 20 of the sleeve 12.

More dense liquid is removed via the outlet involute 37 whereat the spin from the more dense liquid is redirected and the more dense liquid exits the exit 40. The less dense liquid flows through the hole 84 in the nozzle 82 and then through the lumen 76 in the shaft structure 50 and eventually exits through the second opening 80 in the shaft structure 50. Motivation of the sleeve 12 comes from the shaft structure 52 via the connected vanes 54. The shaft structure 50 is itself rotated by the air motor 58. The casing 22 provides proper alignment of the entire structure.

Because of the use of the feed involute passageway 34, the rotation of the sleeve 12 and the use of the outlet involute 37 it is not necessary to maintain a large pressure differential between the fluid inlet port 28 and the more dense liquid exit 40. Hence, one can operate at pressure differentials of the order of only 25 psi and still get very good separation of, for example, oil from water.

Adverting to FIG. 2 another embodiment of the invention is illustrated. In the FIG. 2 embodiment a hydrocyclone 110 is shown wherein the recovery means 174 is different than the recovery means 74 of the FIG. 1 embodiment. In particular, the recovery means 174 of the FIG. 2 embodiment comprises a rod 86 having a longitudinal bore 88 through it. The rod 86 extends from the fluid introduction structure 26 into the region 42 of the axis 20. The bore 88 has a first opening 90 in flow communication with the region 42 of the axis 20 in the upstream end portion 14 of the chamber 18 with the first opening 90 facing the downstream end portion 16 of the chamber 18. The rod 86 also has a second opening 92 from which the less dense liquid is recoverable. In the particular embodiment illustrated the second opening 92 connects to a pipe 94 from which the less dense liquid can be recovered.

Figure 6:
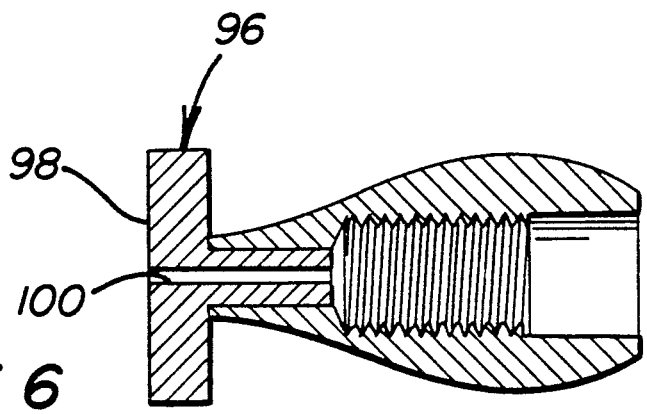
FIG. 6 illustrates in section view a vortex pedestal useful in accordance with the embodiment of FIG. 2.

A pedestal 96, seen best in FIG. 6, is preferably attached to the first end 52 of the shaft structure 50 with the pedestal 96 being positioned to redirect flow in the region 42 of the axis 20 back towards the upstream end portion 14 of the chamber 18 and into the first opening 90 the bore 88 in the rod 86. The pedestal basically has a circular face 98 positioned across the chamber 18 and has a periphery spaced from the interior of the sleeve 12 sufficiently for the more dense liquid to pass around it. The flow is such that only the more dense liquid impacts the pedestal face 98 and a reverse flow of the less dense liquid is created along the axis 20 and back into the opening 90 to the bore 88 in the rod 86.

The embodiment of FIG. 2, like the embodiment of FIG. 1 can include the lumen 76 in the shaft structure 50. In such an instance the pedestal 96 can include a small axial hole 100 through it which communicates with the first opening 78 to the lumen 76. In this manner any entrapped gases (with some concentrated oil) which may be separated at the circular face 98 can exit via the small axial hole 100 and the lumen 76.

Operation of the embodiment of FIG. 2 is much like that of FIG. 1. Fluid introduction and more dense fluid removal occur identically to the embodiment of FIG. 1 as does motivation of the shaft structure 50. The less dense liquid, however, is removed from the upstream end portion 14 of the sleeve 12 rather than from its downstream end portion 16. Removal is via the bore 88 in the rod 86. Thus, the more dense fluid enters the pipe 94 from which it is recovered.

A hydrocyclone 10,110 in accordance with the present invention provides very good separation of a more dense liquid from a less dense liquid with a relatively low pressure differential from the fluid inlet to the more dense liquid outlet. Proper alignment of the structure is provided by the casing 22 whereby flow within the sleeve 12 is particularly accurately directed.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A hydrocyclone for separating a fluid comprising immiscible less dense and more dense liquids from one another, comprising:

a sleeve having upstream and downstream end portions and a longitudinal axis and defining a circularly symmetrical separation chamber;

a relatively stationary longitudinally extending outer casing defining a central passageway about said longitudinal axis in surrounding relation to said sleeve;

a relatively stationary fluid introduction structure having an inlet port and an outlet port with said outlet port in flow communication with said chamber adjacent said upstream end portion of said sleeve, said fluid introduction structure being adapted to impart to said fluid an axial component in the direction of said downstream end portion of said sleeve;

a more dense-liquid recovery structure having an annular recovery entrance and an exit for recovery of said more dense liquid, said recovery entrance being radially displaced from the region of said axis and in flow communication with said downstream end portion of said sleeve;

fluid introduction structure mounting means for mounting said casing to said fluid introduction structure;

more dense-liquid recovery structure mounting means for mounting said casing to said more dense liquid recovery structure;

rotating means for rotating said sleeve in a selected rotational direction about said axis; and less dense liquid recovery means for recovering said less dense liquid from the region of said axis.

2. A hydrocyclone as set forth in claim 1, wherein said fluid introduction structure includes means for imparting a tangential component to said liquid exiting said outlet port, said tangential component being in said selected rotational direction.

3. A hydrocyclone as set forth in claim 2, wherein said more dense liquid recovery structure includes means for directing the more dense fluid through a tangential exit.

4. A hydrocyclone as set forth in claim 1, wherein said more dense liquid recovery structure includes means for directing the more dense fluid through a tangential exit.

5. A hydrocyclone as set forth in claim 1, wherein said rotating means comprises a shaft structure having a first end extending into said downstream end portion of said chamber and being connected to rotate said sleeve, said shaft structure being coaxial with said axis and extending through said more dense liquid recovery structure and means for rotating said shaft structure about said axis.

6. A hydrocyclone as set forth in claim 5, wherein said less dense liquid recovery means comprises a lumen defined by said shaft structure, said lumen having a first opening in flow communication with said region of said axis in said downstream end portion of said chamber and a second opening out of which said less dense liquid exits.

7. A hydrocyclone as set forth in claim 5, wherein said less dense liquid recovery means comprises:
   a rod having a longitudinal bore therethrough and extending from said fluid introduction structure into the region of said axis, said bore having a first opening in flow communication with the region of said axis in said upstream end portion of said chamber and facing said downstream end portion of said chamber and a second opening from which said less dense liquid is recoverable; and
   a pedestal attached to said first end of said shaft structure, said pedestal being positioned to redirect flow in the region of said axis back towards said upstream end portion of said chamber and into said first opening to said bore.

8. A hydrocyclone as set forth in claim 7, further including;
   a vane structure within and connected to said sleeve in said upstream end portion of said chamber, said vane structure being adapted to provide a tangential acceleration to said fluid in said first rotational direction.

9. A hydrocyclone as set forth in claim 8, wherein said pedestal includes a small axial hole therethrough and further including a lumen defined by said shaft, said lumen having a first opening in flow communication with said hole through said pedestal and a second opening out of which any entrapped gases can exit.

10. A hydrocyclone as set forth in claim 1, further including:
    a vane structure within and connected to said sleeve in said upstream end portion of said chamber, said vane structure being adapted to provide a tangential acceleration to said fluid in said first rotational direction.

* * * * *